United States Patent [15] 3,644,276
Wood [45] Feb. 22, 1972

[54] ORTHOESTER STABILIZED POLYVINYL CHLORIDE RESINS

[72] Inventor: Louis L. Wood, 11715 Smoketree Road, Potomac, Md. 20854

[22] Filed: Jan. 30, 1970

[21] Appl. No.: 7,258

Related U.S. Application Data

[63] Continuation-in-part of Ser. No. 736,256, June 12, 1968, abandoned, which is a continuation-in-part of Ser. No. 612,066, Dec. 14, 1966, abandoned, which is a continuation-in-part of Ser. No. 499,093, Oct. 20, 1965, abandoned, which is a continuation-in-part of Ser. No. 403,353, Oct. 13, 1964, abandoned.

[52] U.S. Cl.................260/45.8 A, 260/23 XA, 260/30.6 R, 260/31.8 N

[51] Int. Cl. .....................................................C08f 45/58
[58] Field of Search ..................260/45.80, 45.8 A

[56] References Cited

UNITED STATES PATENTS 2,789,101  4/1957  Wilson............................260/45.85 X Primary Examiner—Donald E. Czaja
Assistant Examiner—M. J. Welsh
Attorney—Elton Fisher and Kenneth E. Prince

[57] ABSTRACT

Vinyl chloride resins are stabilized with orthoesters derived by the condensation of lower alkyl substituted orthoesters with polyhydric alcohols such as glycerol, sorbitol, mannitol, 1,2,4 butane triol, and 1,2,6 hexane triol.

9 Claims, No Drawings

ORTHOESTER STABILIZED POLYVINYL CHLORIDE RESINS

A thermally present application is a continuation-in-part of my earlier filed application 736,256, filed June 12, 1968 now abandoned, which is a continuation-in-part of 612,066, filed Dec. 14, 1966, now abandoned, which in turn is a continuation-in-part of application 499,083, filed Oct. 20, 1965, now abandoned, which in turn is a continuation-in-part of my application 403,353, filed Oct. 13, 1964, now abandoned.

The present invention relates to the stabilization of resins, and more specifically to a novel stabilization agent for stabilizing vinyl chloride polymers and copolymers against the degradation effects of elevated temperatures.

It is well known that vinyl chloride containing resins degrade at elevated temperatures. When vinyl chloride polymers and copolymers are subjected to molding temperatures in excess of about 150° C., they tend to discolor. Serious discoloration occurs even in the relative short period of time required for a molding operation.

To date, numerous stabilizers have been suggested for use in vinyl-chloride-type resins. The most satisfactory of these stabilizers comprise tin, lead and cadmium containing compounds. These compounds, while performing satisfactorily where toxicity is not a problem, cannot be used where the treated polymer is to come into contact with foodstuffs and the like.

As of the present, a highly effective polyvinyl chloride stabilizer which does not possess toxic characteristics or propensities has not been developed.

It is therefore an object of the present invention to provide a novel class of polyvinyl chloride stabilizers.

It is another object to provide novel stabilizers for polyvinyl chloride containing resins which substantially enhance thermal stability of said resins.

It is a further object to provide a class of polyvinyl chloride stabilizers which are nontoxic and may be used in resins which are used in the packaging of foodstuff materials.

These and still further objects of the present invention will become readily apparent to one skilled in the art from the following detailed description and specific examples.

Broadly, my present invention contemplates the following as polyvinyl chloride stabilizer compounds:

I. 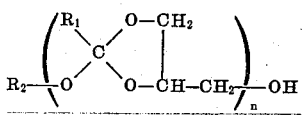

wherein $R_1$ is hydrogen, phenyl or lower alkyl having one to four carbon atoms; $R_2$ is lower alkyl having one to four carbon atoms; and $n$ has a value of 1 to 10.

II. Complex condensates of lower alkyl substituted ortho esters with multifunctional alcohols such as sorbitol, and mannitol which possess four or more hydroxyl groups per molecule. A typical condensation may be described as follows:

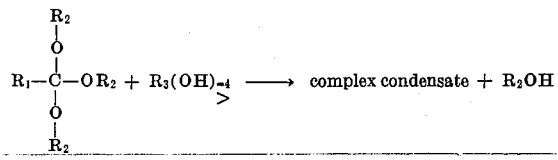

wherein $R_1$ and $R_2$ have meanings given above, and $R_3$ represents the organic residue of a polyfunctional alcohol having a valence of equal to or greater than 4.

Reaction conditions for forming the present orthoester complex condensates I and II involve reacting from about 0.3 to 3.0, preferably about 0.5 to 2.0 moles of polyhydric alcohol per mole of lower alkyl substituted orthoester at a temperature of from about 50° to 200° C., for from about 0.1 to 72 hours.

The rate and degree of reaction is readily followed by collecting displaced alkanol and comparing to the theoretical amount formed on reaction. The reaction follows conventional chemical kinetics in that an increase in temperature will increase the reaction rate and thus decrease the time duration of reaction. The rate of reaction is economically efficient down to 70° C. to 80° C., with the exchange reaction operable down to about 50° C. The upper range of reaction temperature is governed by reactant and reaction control. Reaction can be effectively controlled at temperatures up to about 200° C. In general, the time duration of heating will be dependent on the temperature at which the reaction is conducted.

The type of orthoesters useful in the practice of the present invention are generally described in U.S. application Ser. No. 574,259, filed Aug. 22, 1966, now abandoned. These compounds are prepared by an ester exchange reaction described by Mkhitaryan, V. J. Gen. Chem., (USSR) 8 1361 (1938). During the exchange reaction, alkoxy groups of readily available lower alkyl substituted orthoesters such as trimethylorthoformate, triethylorthoformate, tripropylorthoformate, tributylorthoformate, trimethylorthoacetate, triethylorthoacetate, tripropylorthoacetate, tributylorthoacetate, trimethylorthopropionate, triethylorthopropionate, tripropylorthopropionate and tributylorthopropionate are displaced by a higher boiling polyhydric alcohol such as glycerol, mannitol, sorbitol, 1,2,4 butane triol, and 1,2,6 hexane triol, producing the orthoester complex condensate and alkanol (alkyl alcohol). Present also may be small amounts of unreacted polyhydric alcohol.

The effectiveness of the present orthoester stabilizers may be enhanced by adding thereto a polyhydric alcohol, preferably from about 0.1 to about 10 moles of a high boiling alcohol per mole of orthoester.

Typical alcohols which may be added possess the general structure $$R'(OH)_x$$

wherein $R'$ is an organic radical and $x$ has a value of from 1 to 6. Preferably, these alcohols have a boiling point in excess of about 175° C.

In the above formula, $R'$ may be alkyl, alkylphenyl, phenylalkyl, alkylene, phenylene, polyalkoxyalkylene and trivalent counterparts thereof. Typical polyhydric alcohols useful in the practice of the present invention are o, m, p-xylene, $\alpha$, $\alpha$-diol, trimethylolpropane monopropyl ether, trimethylolpropane monoallyl ether, propylene glycol, diethylene glycol, dimethyloctadiynediol, pentaerythritol, trimethylolpropane, neopentylglycol, benzylalcohol, cetyl alcohol, dipentaerythritol glycerol, mannitol, sorbitol, 1,2,4 butane triol, and 1,2,6 butane triol. When the polyhydric alcohol to be added is the same as that utilized in the ester exchange reaction to produce the orthoester complex condensate, any excess present on completion of reaction need not be removed.

More specifically, I have found that if from about 1 percent to about 10 percent by weight of the above compounds containing orthoester groupings are admixed with polyvinyl chloride, the orthoester compound will stabilize the polyvinyl chloride towards heat induced degration. Furthermore, this stabilization effect may be enhanced by the addition of polyhydric alcohols.

Polyvinyl chlorides which are treated in accordance with the practice of my present invention are those vinyl chloride polymers and vinyl chloride copolymers having a number average molecular weight from about 10,000 to about 150,000 and a weight average molecular weight of from about 20,000 to 1,000.000. These vinyl chloride polymers and copolymers are well known to those skilled in the art and comprise vinyl chloride homopolymers, as well as vinyl chloride copolymers which are prepared by copolymerizing vinyl chloride with a copolymerizable monomer such as unsaturated esters which include vinyl acetate, vinyl formate, vinyl benzoate, vinyl stearate, vinyl oleate, as well as diethyl maleate and diethyl formate. Copolymers may also be prepared by copolymerizing vinyl chloride with an acrylic ester such as methyl-, ethyl-, butyl- and octyl acrylate. It is also contemplated that the vinyl chloride copolymers may be prepared by polymerizing vinyl chloride with vinylidene chloride. The above-mentioned copolymers may contain from 0 to 20, and even 40 percent by weight of copolymerizable monomer.

The stabilization agents, namely the orthoesters contemplated herein, are incorporated with the vinyl chloride polymer and copolymers by any conventional means. The blending may be conveniently carried out, first preparing a slurry of finely divided polymer in a solvent for the orthoester such as methanol, acetone, ethyl ether. The solution is then separated from the slurry, and the polymer particles are dried. This results in polymer particles which are thoroughly coated with the orthoesters set forth herein. It is also contemplated that the blending may be achieved by milling the polymer at the softening temperatures therefor until an intimate blend of the stabilization agent with the polymer.

The stabilized vinyl chloride polymers and copolymers contemplated herein may be used in the formation of rigid polyvinyl chloride molded articles. These rigid molded pieces are formed in extrusion and injection molding devices which are well known to those skilled in the art and which operate in the neighborhood of 150° to 200° C. The stabilization agents contemplated herein effectively stabilize the vinyl chloride polymer and copolymer during the molding process and make it possible to produce rigid moldings having a low degree of color change and good clarity.

It is also contemplated that the polyvinyl chloride resins stabilized by the present stabilizers may be admixed with various plasticizers such as high boiling esters including the alkyl phthalates, phosphates, adipates, sebacates, azelates, and various polymeric-type ester plasticizers. Also, the present composition may contain other additives such as Zn, Mg, Sn and Ca salts of carboxylic acids, and phosphate esters. Furthermore, the resins may be included in plastisol-type preparations which are fabricated by dipping and deposit-type molding techniques.

Having described the basic aspects of my present invention, wherein numerals are used as indicated to indicate the orthoesters, the following specific examples are given to illustrate embodiments thereof:

EXAMPLE I

Poly(glyceryl orthoacetate)—XII

The following table lists reactions of glycerol (95–96 percent, 3–4 percent water) with triethyl orthoacetate (TEOA). In all cases, 90–100 percent of the required amount of ethanol was distilled during the reaction. In several reactions, the addition of a small amount of a monofunctional alcohol (cetyl alcohol) was added as a "chain stopper" to keep the molecular weight (viscosity) of the product at a more manageable level. The structure of the compound corresponds to the following:

(XII)

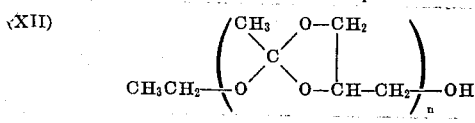

wherein $n$ has a value of 1 to 10, with a value of 3 to 4 predominating.

| Run | Method of preparation | Percent yield and color | Orthoester content (percent of theory) | IR OH (3,400 cm.$^{-1}$)/ CH (2,900 cm.$^{-1}$) | Viscosity at 25° centipoise (Brookfield) |
|---|---|---|---|---|---|
| 1 | 0.5 moles (TEOA plus 0.75 moles glycerol at 110° to 120° C. for 5–6 hours. 1 atm. | 79.0, colorless | 83.5 | 1.871 | 9,940 |
| 2 | 50 moles glycerol added over 3 hours to 50 moles TEOA at 130° C. and 1 atm. Heated 3 more hours at 130–180° C. and 1 atm. | 92.0, orange | 67.0 | 1.236 | 28,250 |
| 3 | 1.0 mole glycerol added over 3 hours to 1.0 mole TEOA at 130° to 140° C. and 1 atm. Last 25% EtOH removed at 10 to 1 mm. | 100, colorless | 68.5 | 1.054 | 12,440 |
| 4 | 1.0 mole TEOA and 1.0 mole glycerol plus 0.004 moles cetyl alcohol at 130° to 140° C. for 5–6 hours. | 96.0, colorless (hazy) | 72.0 | 0.985 | 12,200 |
| 5 | 1.0 mole TEOA added to 1.0 mole glycerol plus toluene over 3–4 hours at 120° C. EtOH distilled over with toluene. | 100, colorless | 78.2 | 0.461 | 45,500 |
| 6 | 1.05 moles TEOA added over 2 hours to 1.0 mole glycerol at 100° to 110° C. Final 25% EtOH removed at 90°–100° C. at 10 to 1 mm. | do | 83.4 | 0.686 | 73,000 |
| 7 | .5 moles TEOA added over 4–5 hours to 1 mole glycerol at 100–110° C. plus 1 atm. Final 25% EtOH removed over 4 hours at 90° C.–100° C. and 10 to 1 mm. | 61.0, colorless | 65.4 | 1.127 | 11,500 |
| 8 | 26.2 moles TOEA added over 4–5 hours to 25.0 moles glycerol plus 0.1 mole cetyl alcohol at 90° to 100° C. and 1 atm. Final 25% EtOH removed over 3 hrs. at 90–100° C. and 10 to 1 mm. | 100, colorless | 76.5 | 0.843 | 18,000 |

EXAMPLE II

Poly(glyceryl orthopropionate)—XXXI

A mixture of 176.3 g. (1 mole) of triethyl orthopropionate and 92 g. (1 mole) of glycerol was heated between 90° to 110° C., and ethanol distilled off through a fractionating column (to prevent the loss of unreacted triethyl orthopropionate) at one atmosphere for several hours. Ninety-one grams (1.98 moles) of ethanol were recovered. The liquid pot residue was then processed in a rotary film evaporator at 110° C. and 2 mm. pressure for six hours to give 36 g. (0.785 moles) of ethanol (dry ice trap) and 132.4 g. of poly(glyceryl orthopropionate) a colorless syrup having a viscosity of 1835 cps. at 25° C. and an orthoester content of 7.61 meq./g. 98.9 percent of theory). The IR and NMR agree with the structure XXXI below, and a value of 0.3 for the ratio of OH end groups to $CH_3CH_3$—C group via the NMR indicates the value of $n$ in structure XXXI is predominantly between 3 and 4.

(XXXI)

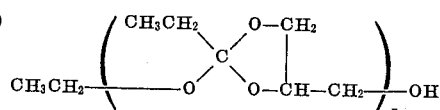

EXAMPLE III

Poly(glycerol orthoformate)—XXVIII

One mole (148 g.) of triethylorthoformate (TEOF) and 1.0 mole (92 g.) of glycerol was placed in a flash evaporator. The mixture was heated at 130°–140° C. for 10 hours. Ethyl alcohol was removed by distillation along with some ethyl acetate. The product was heated for 2 hours at 130° C. under 600 mm. vacuum to remove remaining volatiles. The yield was 110 g. of clear viscous ester having 0.568–0.594 meq. of orthoester group per gram. The viscosity of the product was 29,500 cps. at 25° C.

EXAMPLE IV

Poly(sorbityl orthoacetate)—XXIX

A slurry of 324 g. of triethyl orthoacetate and 182 g. of sorbitol hemihydrate were heated with stirring at 50° to 110° C. for 5 hours at 80° to 110° C. under a vacuum of 150 mm. Hg until distillation of material ceased. A total of 273 g. of ethanol (99 percent of theory) was recovered. The remaining 238 g. of warm thick pale yellow liquid solidified to a glass upon cooling to 25° C.

EXAMPLE V

Poly(mannityl orthoacetate)—XXX

A slurry of 324 g. of triethyl orthoacetate and 182 g. of mannitol were reacted by the procedure set forth in Example IV. A total of 285 g. of ethanol was recovered by distillation. The product weighed 210 g. and was a yellow solid at room temperature.

EXAMPLE VI

In the following runs, particulate polyvinyl chloride having a number average molecular weight of about 38,000 was dry blended with various amounts of orthoester and/or polyhydric alcohol. These samples were then placed in the mixing chamber of a Brabender Plastograph at 190° C. and open to the air. A roller speed of 60 r.p.m. was used to knead the polymer formulations. The Brabender Plastograph continuously records the torque required to knead the mass. From the torque values, one can determine:
  a. The time required for the powder mixture to fuse into a workable plastic mass (flux time)
  b. The force required to work the plastic mass (average torque value)
  c. The onset of cross-linking (decomposition time).

The actual temperature of the plastic mass was also continuously measured. Small samples of the polymers were also removed periodically from the mixing chamber and their color compared to those of the standard Gardner scale.

tion as in claim 1 wherein said polyhydric alcohol is selected from the group consisting of glycerol, mannitol and sorbitol, and said orthoester is selected from the group consisting of trimethyl orthoformate, triethyl orthoformate, tripropylorthoformate, tributylorthoformate, trimethylorthoacetate, triethylorthoacetate, trimethylorthopropionate, triethylorthopropionate, tripropylorthopropionate and tributylorthopropionate.

3. A thermally stabilized polyvinyl chloride resin composition as in claim 1 wherein said composition contains from about 1 to 10 percent by weight of said poly-orthoester.

4. A thermally stabilized polyvinyl chloride composition as in claim 1 which contains from about 1 to 10 percent by weight of an alcohol having a boiling point in excess of about 175° C., and having the formula $R(OH)x$, wherein R is an organic radical and $x$ has a value of from 1 to 6.

5. A thermally stabilized polyvinyl chloride composition as in claim 3 wherein said poly-orthoester is poly(glyceryl orthoacetate).

6. A thermally stabilized polyvinyl chloride composition as in claim 3 wherein said poly-orthoester is poly(glyceryl orthoformate).

TABLE

| Run | Stabilizer (numerals refer orthoester described previously) | Concentration (parts per hundred) | Flux time, minutes | Decomposition time after flux (minutes) | Torque, kg. | Polymer (temperature), degrees | Color (Gardner scale,) 0=colorless, 15=brown | | | |
|---|---|---|---|---|---|---|---|---|---|---|
| | | | | | | | 2 m. | 4 m. | 10 m. | 15 m. |
| 1 | None | | 3.0 | 4.5 | 1.85 | 201–212 | 8 | 15 | (¹) | (¹) |
| 2 | XII | 5.0 | 0.7 | 15 | 1.1–1.8 | 170–200 | 2.2 | 2.2 | 2.2 | 2.5 |
| 3 | XII / (Tri methylol propane monoallyl ether) | 5.0 / 2.0 | 2.5 | 16 | 1.1–1.8 | 160–200 | 1.2 | 1.2 | 1.2 | 1.8 |
| 4 | XXVIII | 5.0 | 0 | 9–10 | 1.8–2.1 | 180–218 | 6.0 | 10 | 12 | |
| 5 | XXIX / Cetyl alcohol / Stearic acid | 5.0 / 2.0 / 0.5 | 0 | 14 | 1.8–2.4 | 190–212 | 2.0 | 2.5 | 5 | |
| 6 | XXX / Cetyl alcohol / Stearic acid | 5.0 / 2.0 / 0.5 | 0 | 5.5 | 1.8–2.4 | 192–206 | 2.0 | 6.5 | | |
| 7 | XII / Cetyl alcohol / Stearic acid | 5.0 / 2.0 / 0.5 | 0 | 15.5 | 1.4–2.4 | 190–210 | 2.0 | 2.0 | 2.0 | 3.0 |
| 8 | XXVIII / Cetyl alcohol / Stearic acid | 5.0 / 2.0 / 0.5 | 0 | 7.5 | 1.7–2.4 | 190–214 | 7.5 | 7.5 | | |
| 9 | Cetyl alcohol | 5.0 / 0.5 | 0 | 5.5 | 1.9–2.1 | 192–210 | 15 | >black | | |
| 10 | XXXI / Stearic acid / Tri (nonylphenyl) phosphate / Acryloid K 120 N | 5.0 / 0.5 / 0.3 / 5.0 | <1.0 | 11.7 | | 194–216 | 0 | 0 | 1.5 | |

¹ Black at 7.5 m.

What is claimed is:

1. A thermally stabilized polyvinyl chloride resin composition comprising polyvinyl chloride and a poly-orthoester selected from the group consisting of poly(sorbityl orthoacetate), poly(mannityl orthoacetate), poly(glyceryl orthoformate), poly(glyceryl orthoacetate) and poly(glyceryl orthopropionate) produced by the process comprising reacting from about 0.3 to 3.0 moles of polyhydric alcohol per mole of lower alkyl substituted orthoester at a temperature of from about 50° to 200° C. for about 0.1 to about 72 hours.

2. A thermally stabilized polyvinyl chloride resin composi-

7. A thermally stabilized polyvinyl chloride composition as in claim 3 wherein said poly-orthoester is poly(glyceryl orthopropionate).

8. A thermally stabilized polyvinyl chloride composition as in claim 3 wherein said poly-orthoester is poly(sorbityl orthoacetate).

9. A thermally stabilized polyvinyl chloride composition as in claim 3 wherein said poly-orthoester is poly(mannityl orthoacetate).

* * * * *